(12) United States Patent
Kochiev et al.

(10) Patent No.: US 11,375,383 B1
(45) Date of Patent: Jun. 28, 2022

(54) DUAL-CONNECTIVITY OUTAGE DETECTION AND REMEDIATION FOR NON-COLLOCATED NETWORK SITES

(71) Applicant: T-Mobile USA, Inc., Bellevue, WA (US)

(72) Inventors: Timur Kochiev, Snoqualmie, WA (US); Alan Denis MacDonald, Bellevue, WA (US); Jun Liu, Issaquah, WA (US); Neng-Tsann Ueng, Bellevue, WA (US); Egil Gronstad, Encinitas, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/124,928

(22) Filed: Dec. 17, 2020

(51) Int. Cl.
| | |
|---|---|
| *H04M 3/00* | (2006.01) |
| *H04W 40/00* | (2009.01) |
| *H04W 16/18* | (2009.01) |
| *H04W 4/02* | (2018.01) |
| *H04W 64/00* | (2009.01) |
| *H04W 76/15* | (2018.01) |

(52) U.S. Cl.
CPC ........... *H04W 16/18* (2013.01); *H04W 4/023* (2013.01); *H04W 64/003* (2013.01); *H04W 76/15* (2018.02)

(58) Field of Classification Search
CPC ..... H04W 16/18; H04W 76/15; H04W 4/023; H04W 64/003
See application file for complete search history.

(56) References Cited

U.S. PATENT DOCUMENTS

| | | | | |
|---|---|---|---|---|
| 2016/0345316 | A1* | 11/2016 | Kazmi | H04W 56/0045 |
| 2018/0014304 | A1* | 1/2018 | Khoshnevisan | H04W 24/08 |
| 2018/0242271 | A1* | 8/2018 | Rune | H04W 64/00 |
| 2018/0270682 | A1* | 9/2018 | Zacharias | H04W 76/10 |

\* cited by examiner

*Primary Examiner* — Erika A Washington
(74) *Attorney, Agent, or Firm* — Lee & Hayes, P.C.

(57) ABSTRACT

A mobile network is analyzed to determine outage regions for a dual-connectivity functionality that uses multiple wireless technologies provided by non-collocated network sites. In some examples, a network configuration server receives and analyzes the locations of base transceiver stations (BTSs) within the mobile network, along with the coverage ranges and wireless technologies supported by the BTS network sites. Based on the analyses, the network configuration server determines regions within which certain dual-connectivity functionality is and is not supported for user equipment (UE) devices. The network configuration server may calculate the outage region for a BTS network site based on the distances between the BTS network site and other BTS network sites providing different wireless technologies for the dual-connectivity functionality. Various elements of the mobile network, including the BTS network sites and/or user mobile devices, may be configured based on the determined outage regions.

20 Claims, 12 Drawing Sheets

Figure 1:
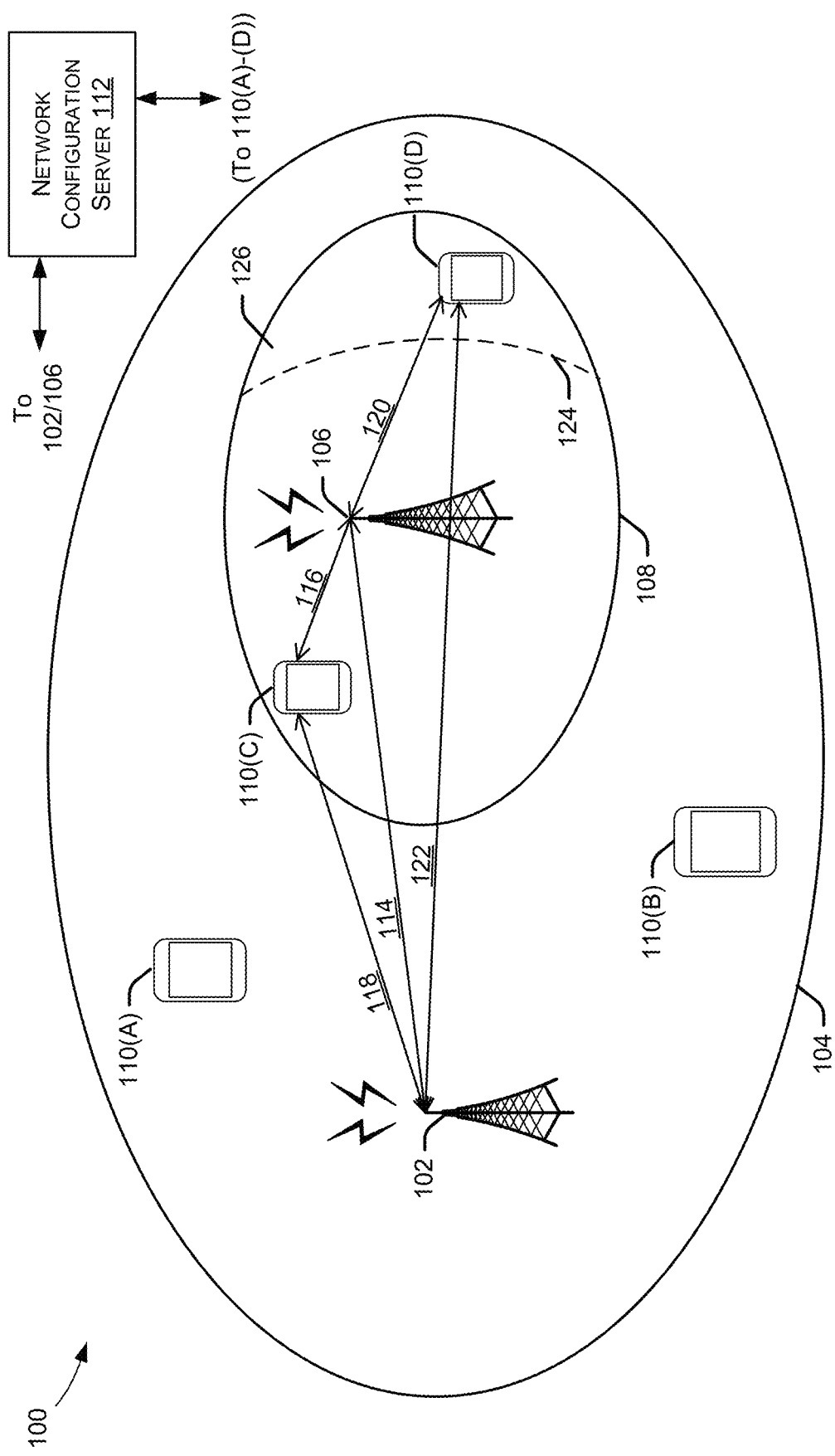

DUAL-CONNECTIVITY OUTAGE DETECTION AND REMEDIATION FOR NON-COLLOCATED NETWORK SITES

BACKGROUND

Cellular communication systems and other mobile networks often include a number of base station transceiver (BST) sites (or network sites) to support wireless communication with user equipment (UE) devices within coverage areas of the network sites. As UE devices move within the mobile network, they may enter and leave the coverage areas of different network sites. These coverage areas overlap in some instances, so that a UE device may connect to either one network site to receive or transmit data, or to multiple network sites simultaneously. Each network site may support one or multiple different wireless technologies for the UE devices within its coverage area(s). For instance, network sites may support various different wireless communication standards, including one or more of the wireless standards within the 3G, 4G, LTE, and/or 5G technologies. These different wireless technologies use different frequency bands and have different wireless service characteristics, such as different coverage ranges, different spectral efficiencies, etc. In some cases, multiple different wireless technologies (e.g., LTE and 5G) are collocated at a single network site that includes dedicated transceivers to support each different wireless service. In other cases, different wireless technologies are provided by non-collocated network sites. For instance, a UE device may connect to one BTS network site that provides LTE wireless service, a different BTS network site that provides 5G NR service, and so on.

In some mobile networks, dual-connectivity functionality is supported in which a UE device simultaneously accesses and transfers data via different wireless technologies. One example of dual-connectivity functionality is E-UTRAN New Radio-Dual Connectivity (EN-DC), in which a UE device connects simultaneously to an LTE master base station and a 5G secondary base station. During an EN-DC communication session, a UE device transmits/receives data simultaneously with both an LTE base station and a 5G base station. Both stations transfer the user data over separate connections to a single gateway server. However, for EN-DC and other dual-connectivity functionality, when the base stations providing the different wireless technologies for a UE device are non-collocated, the separate locations of the base stations can cause synchronization errors and other inefficiencies for the dual-connectivity sessions. For instance, in EN-DC, the communications between the LTE base station and the gateway server may be phase synchronized with the communications between the 5G base station and the gateway server. In such cases, LTE and 5G base stations operating at separate locations may cause time differences in the propagation paths of communications between the UE device and the master base station, which may result in errors and inefficiencies in dual-connectivity sessions and/or outages of the dual-connectivity functionality for certain UE devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a block diagram illustrating components of a mobile network configured to provide dual-connectivity functionality to UE devices, in which certain techniques described herein may be implemented.

FIG. 2 is a block diagram illustrating a dual-connectivity communication session between a UE device and two network sites, in accordance with certain techniques described herein.

FIGS. 3A-3D are diagrams illustrating different relative locations for network sites providing different wireless technologies, and illustrating examples of corresponding outage regions for dual-connectivity functionality, in accordance with certain techniques described herein.

FIG. 4 is a block diagram illustrating various components of a UE device and computer server operating within a mobile network, in which certain techniques described herein may be implemented.

FIG. 5 illustrates an example process of configuring a mobile network based on a determined outage region for dual-connectivity functionality within the mobile network, in accordance with certain techniques described herein.

FIG. 6 illustrates an example process of configuring a network site within a mobile network based on a determined outage region for dual-connectivity functionality, in accordance with certain techniques described herein.

FIG. 7 illustrates an example process of configuring UEs within a mobile network based on a determined outage region for dual-connectivity functionality, in accordance with certain techniques described herein.

FIG. 8 illustrates an example process of calculating outage area and ratio data for dual-connectivity functionality within a mobile network, in accordance with certain techniques described herein.

FIG. 9 is a chart showing example outage data for dual-connectivity functionality within a mobile network, in accordance with certain techniques described herein.

DETAILED DESCRIPTION

This disclosure describes techniques for analyzing a mobile network to determine outage regions within the mobile network where dual-connectivity functionality may not be supported or may not be optimal, and configuring the mobile network based on dual-connectivity outage regions to remediate the errors and inefficiencies caused by the outage regions. In various examples described below, the locations and other wireless service characteristics of BTS network sites within a mobile network are analyzed to determine outage regions within which a dual-connectivity functionality may not be available or may not be optimal. In some examples, outage regions are calculated for a BTS network site based on the distance between the network site and another network site providing a different wireless service used in the dual-connectivity functionality. Based on the outage regions determined for a single BTS network site or a group of associated network sites in the mobile network, various components within the mobile network may be configured to reduce and/or remediate the synchronization errors and other effects of the dual-connectivity outage regions.

FIG. 1 illustrates an example environment within a cellular communication system (which also may be referred to as a mobile network or wireless network) 100. Cellular communication systems such as mobile network 100 generally include a number of network sites (which also may be referred to as base transceiver station (BTSs), base stations, or access points) distributed over a wide geographic region to provide wireless services to electronic devices within the geographic region. Although only two network sites are depicted in FIG. 1, mobile network 100 may include any number of network sites in other implementations.

In this example, network site 102 provides wireless services to devices within a coverage area 104, and network site 106 provides wireless services to devices within a separate coverage area 108. Network sites 102 and 106 each may include a radio antenna and base transceiver station configured to implement the radio access network (RAN) of the mobile network 100. In various implementations, network sites 102 and 106 may support different of radio access technologies, including one or more $3^{rd}$ Generation (3G), $4^{th}$ Generation (4G), and $5^{th}$ Generation radio access technologies. Using these technologies, the network sites 102 and 106 may implement one or more varieties of RAN, including but not limited to a GSM radio access network (GRAN), a GSM edge radio access network (GERAN), a UMTS radio access network (UTRAN), and/or an Evolved Universal Terrestrial Radio Access Network (E-UTRAN). As discussed below in more detail, network sites 102 and 106 provide mobile services to UE devices 110 within their respective coverage areas 104 and 108, and serve as intermediary nodes between the UE devices 110 and a core network which may include a circuit-switched or packet-switched network.

Four UE devices 110a-110d are depicted in FIG. 1, which may be referred to individually or collectively as UE device(s) 110, although any number of UE devices 110 may be present within the mobile network 100 at any time. UE devices 110 may comprise any type of device capable of wireless communication with the network sites 102 and/or 106 and/or other wireless radio components. For example, each UE device 110 may comprise a cell phone, a smartphone, a laptop or tablet computer, a smart watch or other wearable computing device, an Internet-of-Things (IoT) device, or any other electronic device capable transmitting or receiving wireless data.

In some examples, a single network site within a mobile network 100 may support multiple types of wireless technologies. For instance, network site 102 and/or network site 106 may include transceivers and related components to support both Long-Term Evolution (LTE) radio access technologies and 5G New Radio (NR) radio access technologies.

Additionally or alternatively, different network sites within a mobile network 100 may support alternative wireless technologies. For instance, network site 102 may comprise a 5G NR site operating at a lower frequency band, while network site 106 comprises an LTE site operating at a mid-range frequency band. In such examples, UE devices 110a and 110b may receive 5G service from network site 102, but are located outside of the coverage area 108 and thus might not receive LTE service from network site 106. UE devices 110c and 110d, by contrast, are within both coverage areas 104 and 108, and thus may receive 5G service from network site 102 and/or may receive LTE service from network site 106.

As noted above, some mobile networks may support dual-connectivity functionality in which a UE device 110 may simultaneously transfer data via different wireless technologies. For example, network sites 102 and 106 were described above as non-collocated network sites, because they operate at separate site locations from which network site 102 provides one type of wireless technology and/or frequency band (e.g., 5G NR, low band), and network site 106 provides a different type of wireless technology and/or frequency band (e.g., LTE, mid-band). In such examples, dual-connectivity functionality may be supported for UE devices 110c and 110d, which are within the coverage areas of both network sites 106, but not for UE devices 110a and 110b which are only within the coverage area of the 5G NR network site 102.

Figure 2:
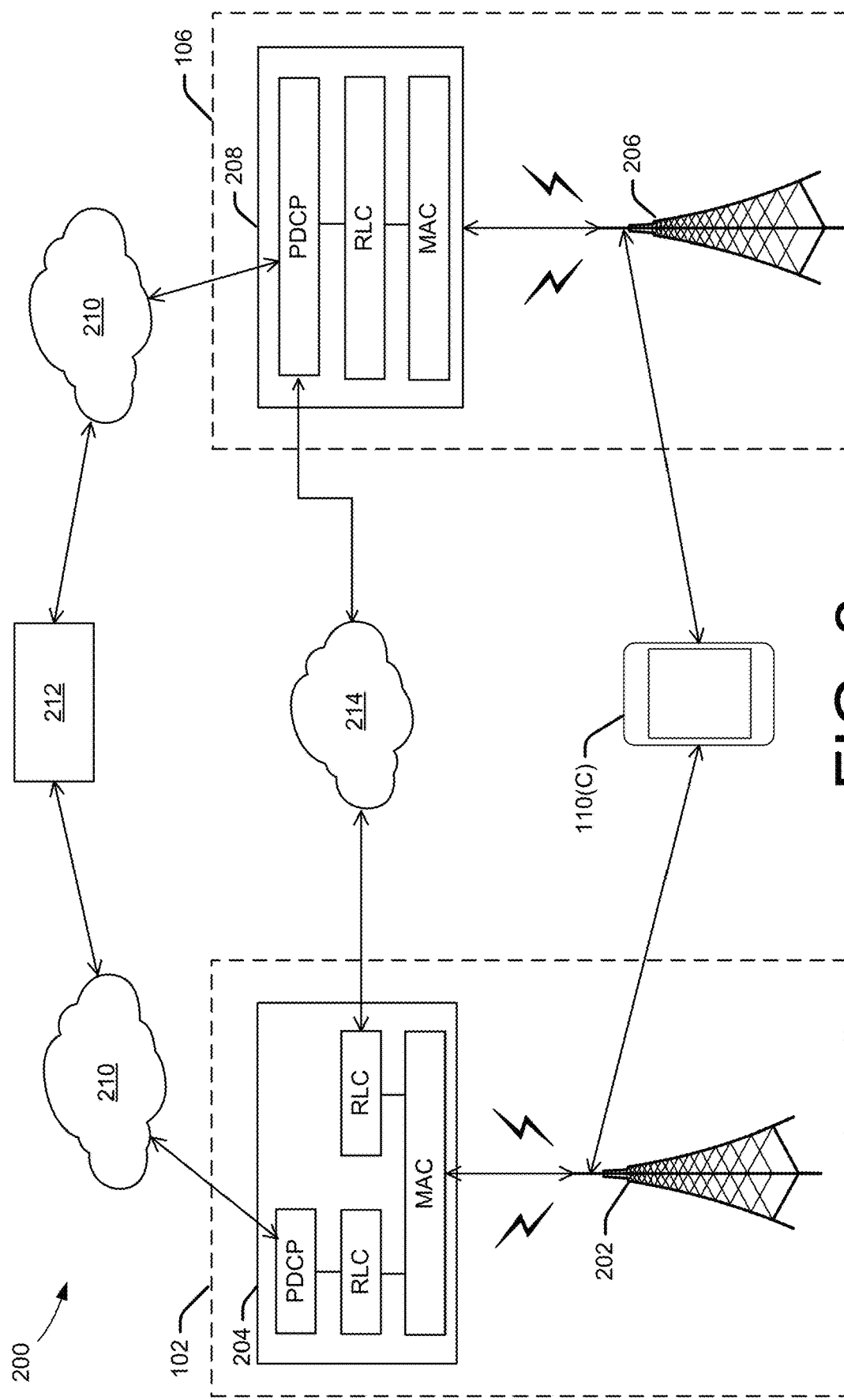

FIG. 2 illustrates an example of dual-connectivity functionality between a UE device and two non-collocated network sites providing different wireless technologies. In this example, mobile network 200 may be similar or identical to the mobile network 100, and network sites 102 and 106 may be similar or identical to corresponding network sites 102 and 106, discussed above in reference to FIG. 1. As shown in FIG. 2, network sites 102 and 106 may include transceivers 202 and 206, and base stations 204 and 208, respectively. Each base stations 204 and 208 include components to support various radio protocol layers of the RAN. In some examples, FIG. 2 may depict an EN-DC dual-connectivity session, in which the UE device 110(c) simultaneously connects to and transfers data with one network site 106 (e.g., an LTE master node), and another network site 102 (e.g., a secondary 5G node).

In examples such as those depicted in FIG. 2, dual-connectivity functionality may be initiated and managed by a first network site 106 (e.g., the LTE master node), which receives communications directly from the UE device 110(c) and/or indirectly from a second network site 102 (e.g., the 5G secondary node). In such examples, the dual-connectivity functionality may be controlled by the master network site 106, which may initially establish a connection with the UE device 110(c) and indicate support for dual-connectivity functionality on the frequency band of the secondary network site 102. The master network site 106 may instruct the UE device 110(c) to search for available secondary nodes that support additional wireless technologies for dual connectivity. After receiving data from the UE device 110(c) indicating that a secondary network site is available, the master network site 106 may provide both the UE device 110(c) and the secondary network site 102 with parameters to allow the UE device 110(c) and the secondary network site 102 to establish a connection.

After the connections have been established during a dual-connectivity session with a UE device 110(c), the master network site 106 may transfer outgoing and incoming data between the UE device 110(c) and a server 212 of the core network, via a communication network 210. The master network site 106 also may instruct the server 212 to communicate directly with the secondary network site 102 for transferring outgoing and incoming data to and from the UE device 110(c).

As shown in this example, data transferred from the UE device 110(c) to the master network site 106 may be received by the transceiver 206 and processed by a medium access control (MAC) sublayer, a radio control link layer, and a Packet Data Convergence Protocol (PDCP) within the base station 208 of the network site 106. The MAC sublayer is within the data link layer, and controls the hardware of the wireless transmission medium, and provides the flow control and multiplexing for the transmission medium. The RLC layer is a layer 2 Radio Link Protocol used in UMTS and LTE on the Air interface, and the PDCP layer is located in the Radio Protocol Stack in the UMTS/LTE/5G Air interface on top of the RLC layer. Similarly, data transferred from the UE device 110(c) to the secondary network site 102 may be received by the transceiver 202 and processed by a MAC layer, the RLC layer, and the PDCP layer within the base station 204 of the secondary network site 102. From the PDCP layer of base stations 204 and 208, user data is transferred over a communication network 210 to the server 212. In some examples, server 212 may be a gateway server of an LTE core network or 5G core network, and the data may be transferred between the base stations 204 and 208 and the server 212 via S1-U (User) interfaces and connections. In this example, both base stations 204 and 208 may have S1-U interfaces, over which user data is transferred between the UE device 110(c) and the server 212 (e.g., as IP packets). In certain implementations, the mobile network 200 may support one S1-U connection for a UE device at a time, so that transfers of user data for the UE device 110(c) may be performed between the server 212 and either base stations 204 or base station 208, but where data is not transferred between both base stations 204 and 208 and the server 212 simultaneously.

Additionally or alternatively, some portions of the incoming or outgoing data for the UE device 110(c) may be transferred from the master network site 106 to the secondary network site 102, or vice versa. For example, if a user data stream is received at the master network site 106 from the server 212, the master network site 106 may directly transmit a portion of the incoming data from the core network directly to the UE device 110(c), and may forward another portion of the incoming user data stream to the secondary network site 102. This concept may be referred to as a split bearer. As shown in this example, the master network site 106 may exchange user data with the secondary network site 102 over a transport network 214, for instance, via an X2-U (User) interface. The data may be transferred from the PDCP layer of the base station 208, over the transport network 214, to the RLC layer of the base station 204, or vice versa.

As illustrated by these examples, FIG. 2 depicts dual-connectivity functionality that allows a UE device 110(c) to simultaneously communicate and transfer data using two different wireless technologies provided by two different network sites 102 and 106, such as a master LTE network node at network site 106 and a secondary 5G node at network site 102. The dual-connectivity functionality in such examples involves two non-collocated transceivers 202 and 206. Accordingly, the capabilities and performance of the dual-connectivity functionality may be affected by timing differences of the signals transmitted between the UE device 110(c) via the master network site 106, versus signals transmitted between the UE device 110(c) via the secondary network site 102.

In examples of dual-connectivity functionality like those described above in reference to FIGS. 1 and 2, for outgoing data transfers (from a UE device 110 to a server 212) and/or incoming data transfers (from a server 212 to a UE device 110), dual-connectivity functionality may require that the data transfers from the different network nodes 102 and 106 are synchronized in accordance with a maximum timing difference. For instance, in EN-DC functionality involving a LTE master network site 106 and a 5G secondary network site 102, base stations and UE devices may implement standards that define a maximum receive timing difference between the start of a subframe received from the LTE anchor master node (MN) (e.g., network site 106) and the start of a subframe received from the 5G NR secondary node (SN) (e.g., network site 102). For example, the 3GPP Standard, TS 38.133 RRM v15.5.0 defines a maximum timing difference of 33 microseconds (μs) between receiving subframes from the master and secondary network nodes. In this example, for base stations that have a cellular signal phase synchronization accuracy of 3 μs, the maximum time difference based on different path lengths is 30 μs, which corresponds to a path distance difference of 9 kilometers (km). Thus, in this example, the EN-DC synchronization eligibility requirement may be met for propagation differences not exceeding 9 km. This synchronization eligibility requirement means that when the non-collocated network sites 102 and 106 are less than or equal to 9 km apart, EN-DC functionality is available and may be supported by the network sites 102 and 106. However, in this example, when the non-collocated network sites 102 and 106 are greater than 9 km apart, EN-DC functionality might not be available and/or might result in errors or outages.

Referring again to FIG. 1, a network configuration server 112 associated with the mobile network 100 is also shown in this example. As described below in more detail, the network configuration server 112 may monitor the mobile network 100, receive and analyze data associated with the network sites 102 and 106, determine outage regions within the mobile network 100 where dual-connectivity functionality is not available, and/or configure the network sites 102 and 106 and/or UE devices to address the dual-connectivity outage areas within the mobile network 100.

As shown in FIG. 1, lines 114-122 represent several paths (and/or distances) associated with supporting dual-connectivity functionality for UE devices 110(c) and 110(d), using non-collocated network sites 102 and 106. Initially, line 114 represents the $D_{m\_s}$, which is the distance between the non-collocated network sites 102 and 106, which may be a fixed distance when network sites 102 and 106 are non-moveable. When supporting dual-connectivity functionality for UE device 110(c), data is transferred between the UE device 110(c) and the first network site 106 (e.g., an LTE master node) over a first path (line 116), and between the UE device 110(c) and the second network site 102 (e.g., a 5G secondary node) over a second path (line 118). Similarly, when supporting dual-connectivity functionality for UE device 110(d), data is transferred between the UE device 110(d) and the first network site 106 over a first path (line 120), and between the UE device 110(d) and the second network site 102 over a second path (line 122).

In these examples, FIG. 1 illustrates that dual-connectivity functionality may be available for some UE devices 110 but not for others within the coverage areas 104 and 108 of both network sites 102 and 106, based on a path length difference threshold. As discussed above, dual-connectivity functionality might not be supported for a UE device 110 from non-collocated network sites 102 and 106, based on the propagation time differences caused by different path lengths between the UE device 110 and the network sites 102 and 106. Specifically, if the difference in signal transmission times between the paths is greater than a threshold amount of time (which corresponds to a path length difference greater than a threshold distance), then operating in a dual-connectivity mode may result in synchronization loss and/or errors during data transfers at the UE device 110 and/or at network sites 102 and 106. In such cases, performance of the UE device 110 may be affected by the timing difference of the signals received from the network sites 102 and 106. As discussed above, for at least some implementations of EN-DC functionality, the mobile network 100 may have a synchronization eligibility requirement corresponding to a 9 km path length difference.

Within the example mobile network 100, the network configuration server 112 may use equations to calculate the outage region(s) within which the dual-connectivity functionality might not be available or might not be optimal based on the non-collocated network sites 102 and 106. Such equations may be based on threshold (t) representing the maximum difference in the path lengths between the UE device 110 and the network sites 102 and 106. As an example, for EN-DC functionality the threshold (t) may correspond to the 9 km synchronization eligibility requirement, discussed above.

For a UE device within the coverage area of two non-collocated network sites, dual-connectivity functionality may be available for the UE device if the difference between the path lengths from the UE device to the network sites is less than the maximum difference threshold (t), as shown in Equation 1:

$$|D_{UE\_s} - D_{UE\_m}| \leq t \qquad \text{Equation 1}$$

In this example, $D_{UE\_m}$ represents the distance between the UE device 110 and the master network site 106, $D_{UE\_s}$ represents the distance between the UE device 110 and the secondary network site 102, and t represents the maximum difference threshold for supporting dual-connectivity functionality in the mobile network 100. In this example, if Equation 1 is true for a UE device 110, then dual-connectivity functionality may be supported for the UE device 110.

$$|D_{UE\_s} - D_{UE\_m}| \leq t \qquad \text{Equation 2}$$

In contrast, if Equation 2 is true for a UE device 110, then the UE device 110 is in an outage region within which dual-connectivity functionality is supported.

$$D_{m\_s} \leq t \qquad \text{Equation 3}$$

In this example, $D_{m\_s}$ represents the distance between the master network site 106 and the secondary network site 102. If Equation 3 is true for a pair of non-collocated network sites, then dual-connectivity functionality may be supported for all UE devices 110 within the coverage areas of both network sites.

Returning again to FIG. 1, the equations above may be used to determine a dual-connectivity outage area for network sites 102 and 106, and/or to determine which UE devices 110 are within the outage area. As mentioned above, if the distance $D_{m\_s}$ between the network sites 102 and 106 (line 114) is less than the maximum difference threshold (t) for supporting dual-connectivity functionality, then no dual-connectivity outage region may be present. In this example, it may be assumed that the distance $D_{m\_s}$ between the network sites 102 and 106 (line 114) is greater than the maximum difference threshold (t), and therefore a dual-connectivity outage region exists. For instances when this example corresponds to EN-DC functionality, the maximum difference threshold (t) may equal approximately 9 km, and the distance $D_{m\_s}$ between the network sites 102 and 106 may be assumed to be greater than 9 km.

To calculate the dual-connectivity outage region in FIG. 1, the network configuration server 112 may use the locations of the network sites 102 and 106, and the maximum difference threshold (t) for supporting dual-connectivity. As noted above, a UE device 110 may be in an outage region for dual-connectivity, when the difference in the path lengths between the UE device 110 and the network sites 102 and 106 (e.g., $|D_{UE\_m} - D_{UE\_s}|$) is greater than the threshold (t), causing synchronization loss and transmitting/receiving errors. In this example, the border 124 of the outage region 126 may be defined as the set of locations within both coverage areas 104 and 108 for which $D_s = D_m + t$, that is, for which the distance to the farther secondary network site 102 ($D_s$) equals the distance from the border 124 to the closer master network site 106 ($D_m$) plus the threshold value (t).

Accordingly, in this example, dual-connectivity functionality may be available for UE devices (e.g., UE device 110(c)) that are within both coverage areas 104 and 108, and are not located within the outage region 126, while dual-connectivity functionality might not be available for UE devices (e.g., UE device 110(d)) that are within the outage region 126. For instance, for UE device 110(c), an analysis of the angles of the triangle formed by the UE device 110(c) and network sites 102 and 106 (e.g., defined by lines 114, 116, and 118), shows that the path length difference between $D_m$ (line 116) and $D_s$ (line 118) is less than the $D_{m\_s}$ (line 114), and thus is also less than the maximum difference threshold (t). Therefore, UE device 110(c) is not within the outage region 126. In contrast, for UE device 110(d), an analysis of the angles of the triangle formed by the UE device 110(d) and network sites 102 and 106 (e.g., defined by lines 114, 120, and 122), shows that the path length difference between $D_m$ (line 120) and $D_s$ (line 122) is greater than both the $D_{m\_s}$ (line 114) and the maximum difference threshold (t). Therefore, UE device 110(d) is not within the outage region 126.

FIGS. 3A-3D are diagrams illustrating different configurations of network sites 102 and 106 that provide different wireless technologies. As discussed below, these diagrams also illustrate examples of possible dual-connectivity outage regions (or the lack of dual-connectivity outage regions) based on the relative positions of the network sites and a maximum difference threshold for supporting dual-connectivity functionality in the mobile 100. In some examples, the network sites 102 and 106 in diagrams 300A-300D may represent an LTE master network site 106 and a 5G secondary network site 102, which may be configured to interact as described above to provide EN-DC functionality. In such cases, the maximum difference threshold (t) for supporting dual connectivity may be approximately 9 km. However, the examples shown in diagrams 300A-300D need not relate to EN-DC functionality, but may be applied to any other dual-connectivity (or multi-connectivity) functionality based on non-collocated network sites.

Each of FIGS. 3A-3D include network sites 102 and 106, which may be similar or identical to the corresponding network sites 102 and 106 discussed above in reference to FIGS. 1 and 2. For example, network site 106 may be referred to as a master network site (or master node) and may provide LTE service to UE devices within its coverage area, and network site 102 may be referred to as a secondary network site (or secondary node) and may provide 5G NR service UE devices within its coverage area. The coverage area 108 associated with master network site 106 is also shown, and it may be assumed in these examples that the coverage area associated with the secondary network site 102 (not shown) encompasses at least the coverage area 108.

Figure 3A:
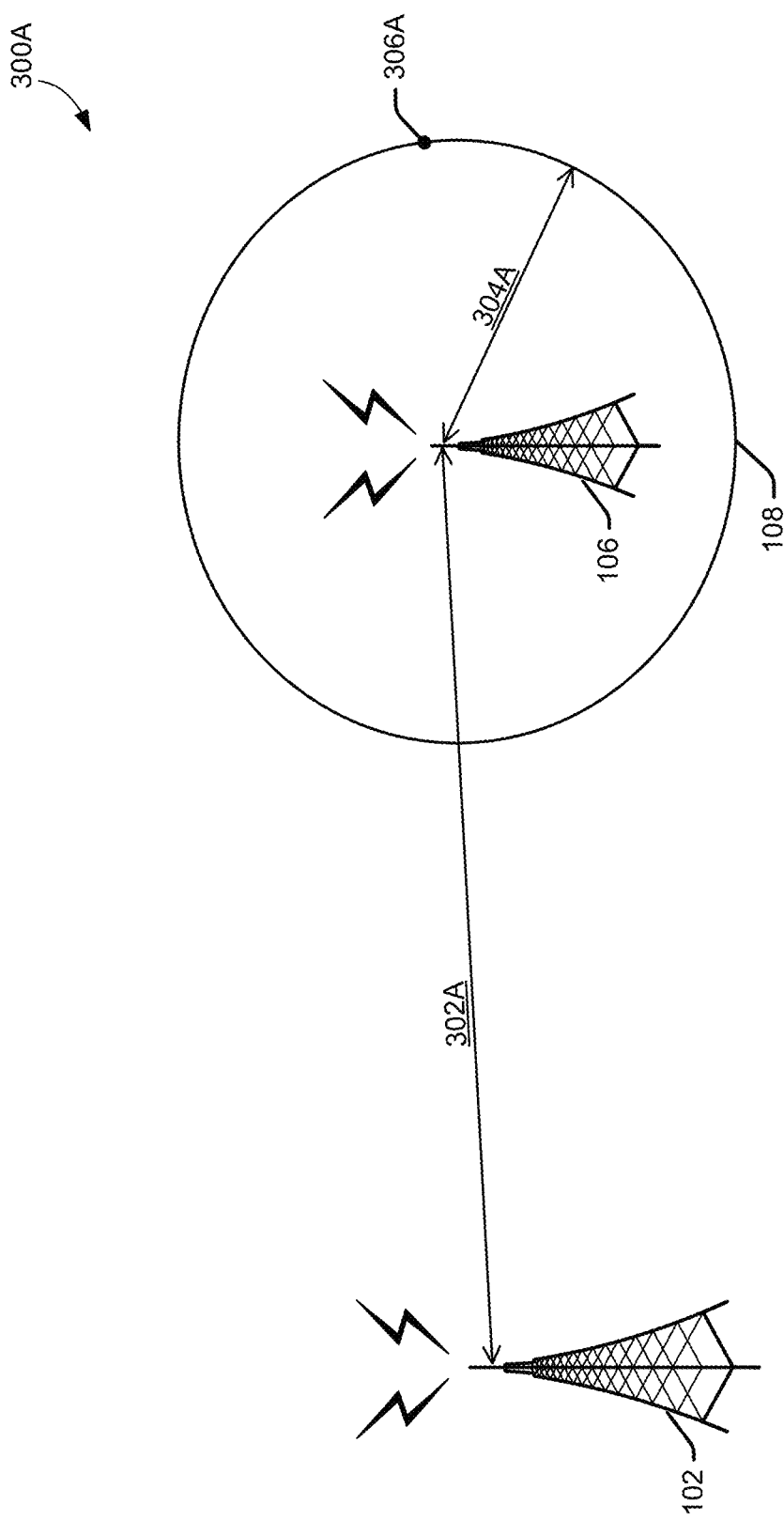

In FIG. 3A, diagram 300A shows non-collocated network sites 102 and 106, separated by a distance $D_{m\_s}$, represented by line 302A. The radius of the coverage area 108 of network site 106 is represented by line 304A. In this example, it may be assumed that the $D_{m\_s}$ distance (line 302A) is less than or equal to the maximum difference threshold (t) for supporting dual-connectivity functionality. For instance, for EN-DC functionality in which the maximum difference threshold (t) is 9 km, the distance $D_{m\_s}$ (line 302A) may be any distance less than or equal to 9 km. In this example, the maximum path difference for any UE device 110 within the coverage area 108 would occur for a UE device 110 at location 306A, the worst-case scenario location farthest away from network site 102, where the location 306A of the UE device 110 is colinear with the locations of the network sites 102 and 106. At location 306A, the path difference equals $D_s$–$D_m$, which equals $D_{m\_s}$. Because $D_{m\_s}$ is less than or equal to the maximum difference threshold (t) in this example, location 306A is not within a dual-connectivity outage region. All other locations within the coverage area 108 are also not within a dual-connectivity outage region, and thus a dual-connectivity outage region does not exist in diagram 300A.

Figure 3B:
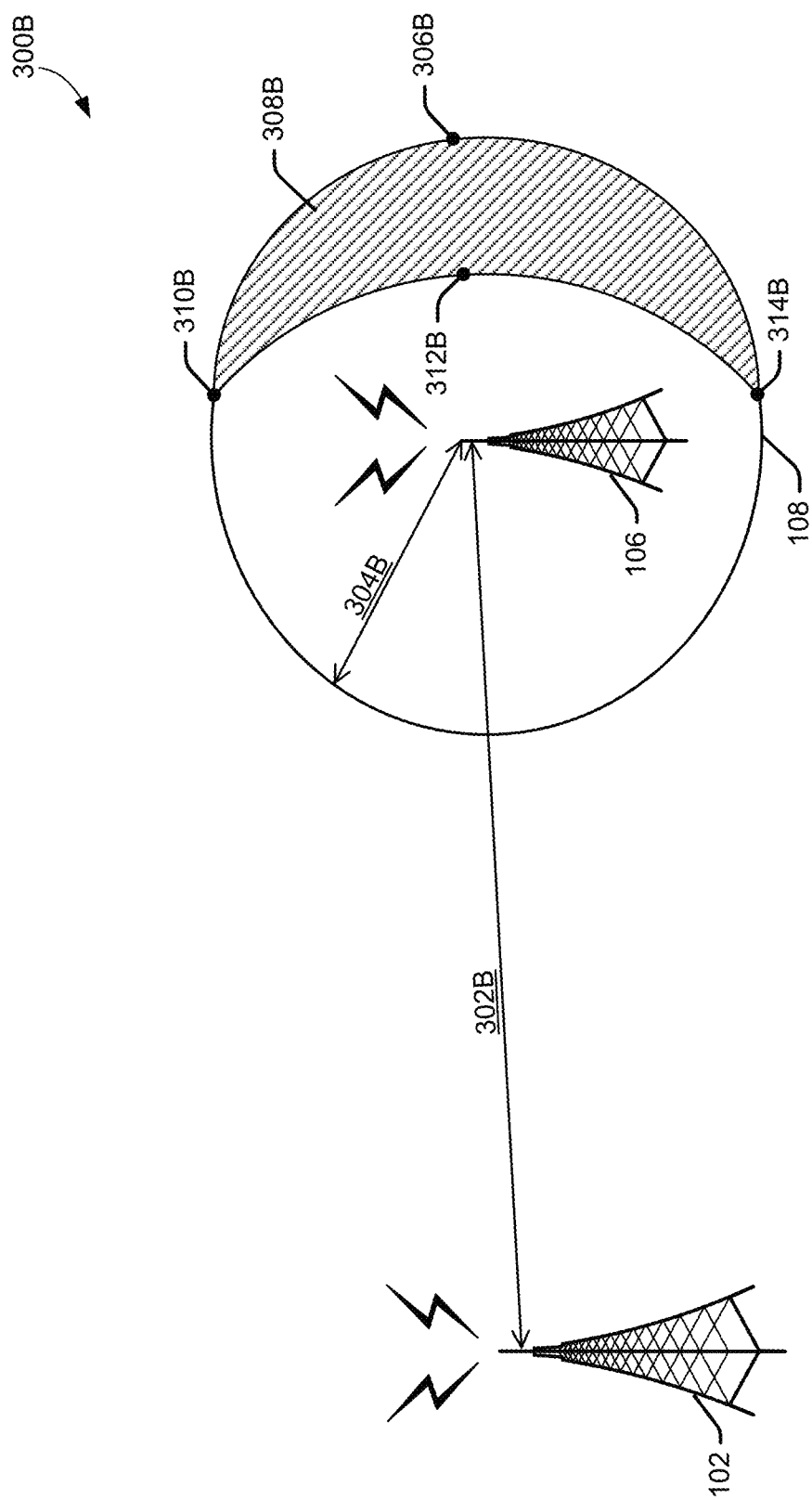

In FIG. 3B, diagram 300B shows non-collocated network sites 102 and 106, separated by a distance $D_{m\_s}$, represented by line 302B. The radius of the coverage area 108 of network site 106 is represented by line 304B. In this example, it may be assumed that the $D_{m\_s}$ distance (line 302B) is greater than the maximum difference threshold (t) for supporting dual-connectivity functionality. For instance, for EN-DC functionality in which the maximum difference threshold (t) is 9 km, the distance $D_{m\_s}$ (line 302B) may be a distance greater than 9 km. As in the above example, the maximum path difference for any UE device 110 within the coverage area 108 would occur for a UE device 110 at location 306B, the farthest point away from network site 102, where the location 306B of the UE device 110 is colinear with the locations of the network sites 102 and 106. At location 306B, the path difference equals $D_s$–$D_m$, which equals $D_{m\_s}$. Because $D_{m\_s}$ is greater than the maximum difference threshold (t) in this example, location 306B is within a dual-connectivity outage region 308B. To determine the size, shape, and dimensions of the dual-connectivity outage region 308B, the network configuration server 112 may perform similar calculates to those described above in FIG. 1. In this example, the outage region 308B is a crescent-shaped region defined by a curved interior border and the outer perimeter of the coverage area 108. The interior border of the outage region 308B may be defined as the set of locations within the coverage area 108 for which $D_s$=$D_m$+t, that is, for which the distance to the farther secondary network site 102 ($D_s$) equals the distance from the border to the closer master network site 106 ($D_m$) plus the threshold value (t). In this example, for each of the locations 310B, 312B, and 314B on the interior border of the outage region 308B, $D_s$=$D_m$+t. Accordingly, dual-connectivity functionality may be available for any UE device within the coverage area 108 that is not located within the outage region 308B, while dual-connectivity functionality is not available for UE devices within the outage region 308B.

Figure 3C:
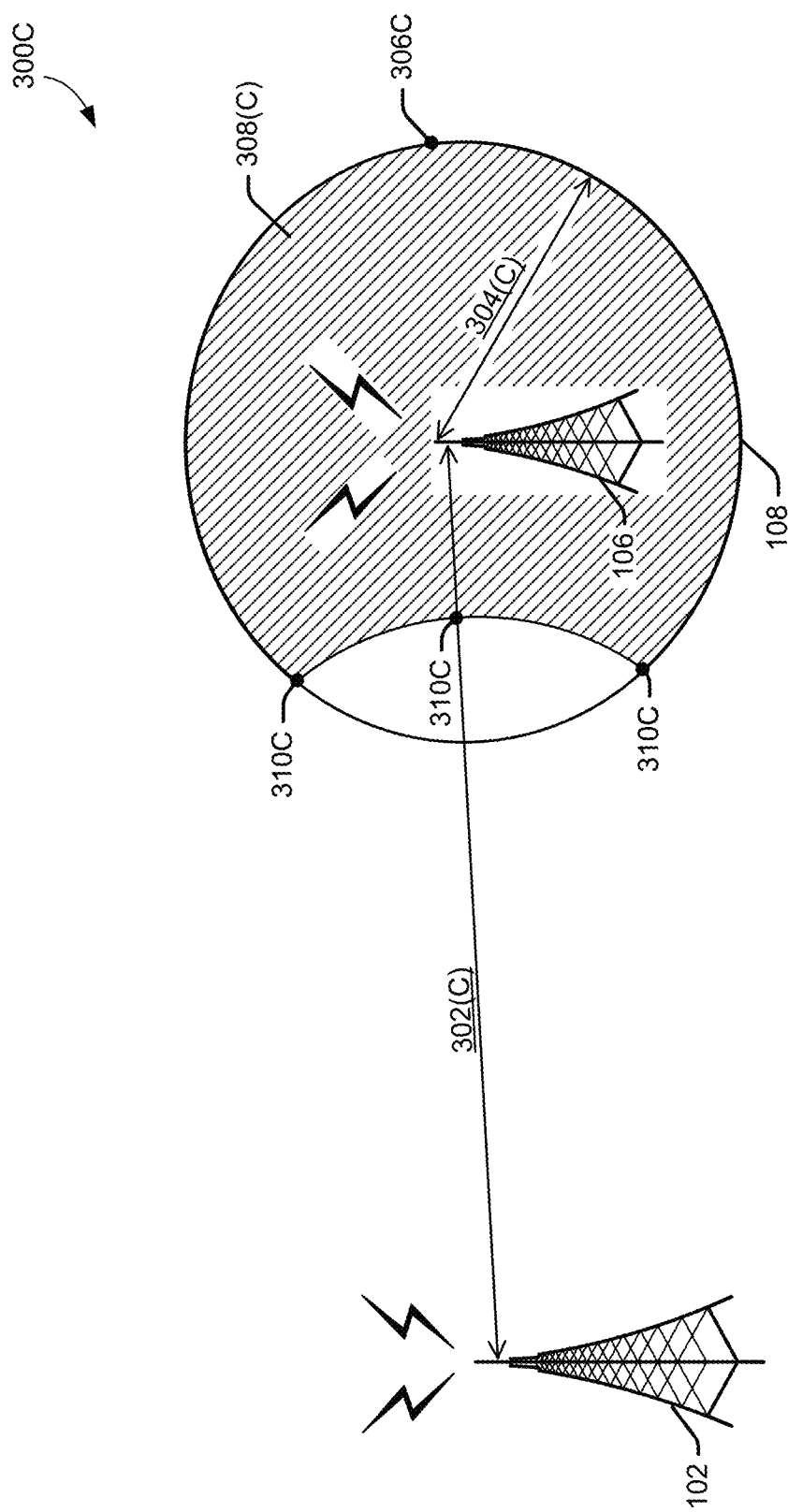
Figure 3D:
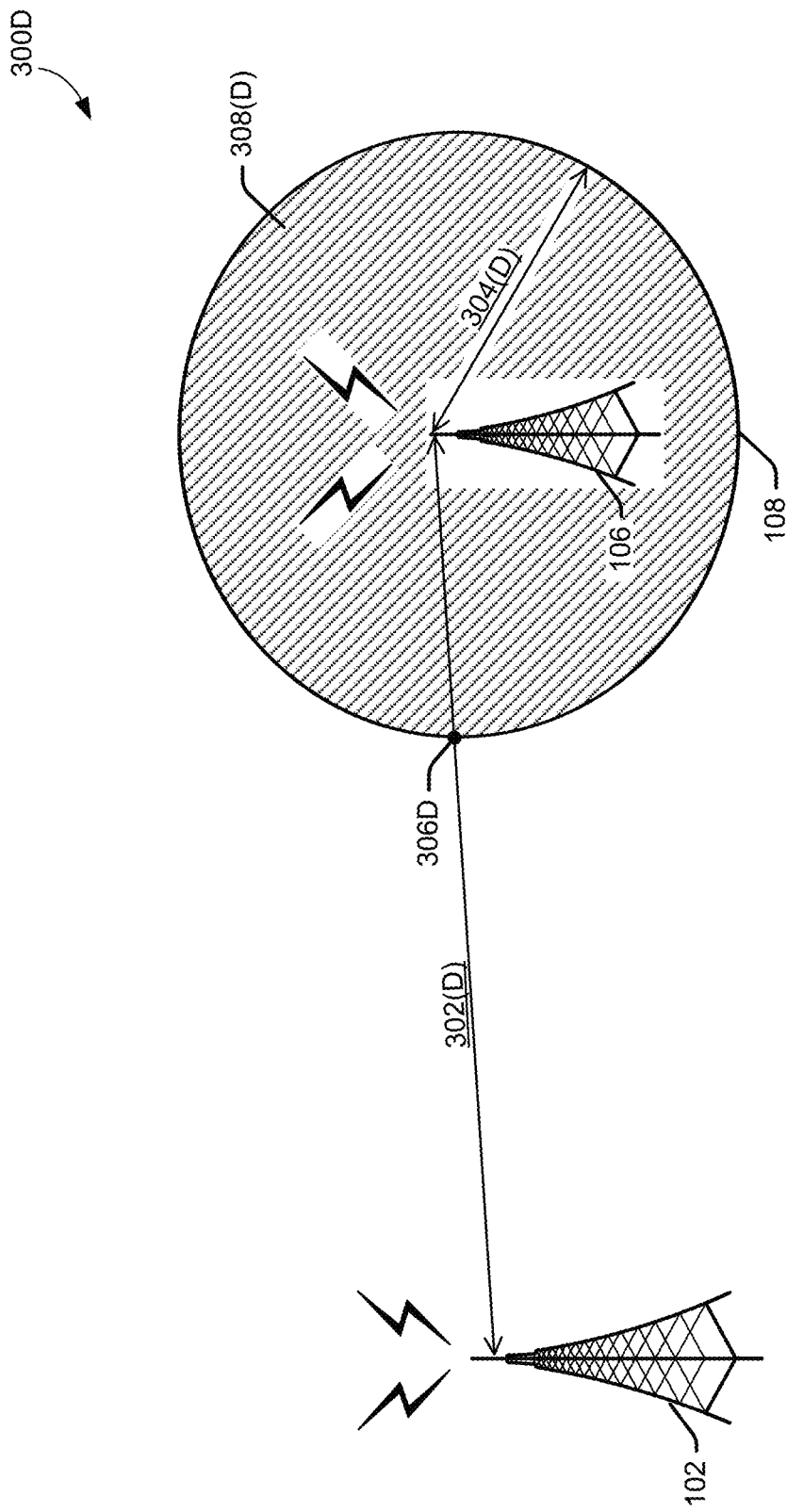

FIG. 3C shows a similar example to that shown in FIG. 3B, but assumes a greater distance between the non-collocated network sites 102 and 106. In this example, the network sites 102 and 106 in diagram 300C are separated by a distance $D_{m\_s}$, represented by line 302C. The radius of the coverage area 108 of network site 106 is represented by line 304C. In this example, it may be assumed that the $D_{m\_s}$ distance (line 302C) is greater than the maximum difference threshold (t) for supporting dual-connectivity functionality. For instance, for EN-DC functionality in which the maximum difference threshold (t) is 9 km, the distance $D_{m\_s}$ (line 302C) may be a distance greater than 9 km. As in the above example, the maximum path difference for any UE device 110 within the coverage area 108 would occur for a UE device 110 at location 306C, the farthest point away from network site 102, where the location 306C of the UE device 110 is colinear with the locations of the network sites 102 and 106. At location 306C, the path difference equals $D_s$–$D_m$, which equals $D_{m\_s}$. Because $D_{m\_s}$ is greater than the maximum difference threshold (t) in this example, location 306C is within a dual-connectivity outage region 308C. To determine the size, shape, and dimensions of the dual-connectivity outage region 308C, the network configuration server 112 may perform similar calculates to those described above. The interior border of the outage region 308B may be defined as the set of locations within the coverage area 108 for which $D_s$=$D_m$+t, that is, for which the distance to the farther secondary network site 102 ($D_s$) equals the distance from the border to the closer master network site 106 ($D_m$) plus the threshold value (t). In this example, for each of the locations 310C, 312C, and 314C on the interior border of the outage region 308C, $D_s$=$D_m$+t. Accordingly, dual-connectivity functionality may be available for any UE device within the coverage area 108 that is not located within the outage region 308C, while dual-connectivity functionality is not available for UE devices within the outage region 308C.

In FIG. 3C, diagram 300D shows non-collocated network sites 102 and 106, separated by an even larger distance $D_{m\_s}$, represented by line 302D. The radius of the coverage area 108 of network site 106 is represented by line 304D. In this example, it may be assumed that the $D_{m\_s}$ distance (line 302D) greater than the maximum difference threshold (t) for supporting dual-connectivity functionality. For instance, for EN-DC functionality in which the maximum difference threshold (t) is 9 km, the distance $D_{m\_s}$ (line 302D) may be greater than 9 km. In fact, in this example, the $D_{m\_s}$ (line 302D) is greater than the maximum difference threshold (t) plus the radius (line 304D) of the coverage area 108. Therefore, the entire coverage area 108 of the master network site 106 is within the dual-connectivity outage region 308D. To illustrate, the minimum path difference in this example for any UE device 110 within the coverage area 108 would occur for a UE device 110 at location 306D, the closest point to network site 102, where the location 306D of the UE device 110 is colinear with the locations of the network sites 102 and 106. At location 306D, the path difference equals $D_s$–$D_m$, which also equals $D_{m\_s}$–$D_m$. Because the distance $D_{m\_s}$ between the network sites 102 and 106 (line 302D) is greater than the sum of the maximum difference threshold (t) and the radius (line 304D), therefore, even at the best-case scenario location 306D the path difference ($D_s$–$D_m$) is greater than the maximum difference threshold (t). Accordingly, location 306D and all other locations within the coverage area 108 are within the dual-connectivity outage region in diagram 300D.

In the examples shown in FIGS. 3A-3D, the network configuration server 112 may use the equations and techniques above to calculate the size (or area) of the outage regions determine for the pair of non-collocated network sites 102 and 106. The area ($A_x$) of the outage region may range between zero and the entire area defined by the coverage area 108 of the master network site 106 ($A_m$). Additionally or alternatively, the network configuration server 112 may calculate outage ratio for the pair of non-collocated network sites 102 and 106, which may be expressed as $A_x/A_m$, where the ratio may range from zero to one.

Figure 4:
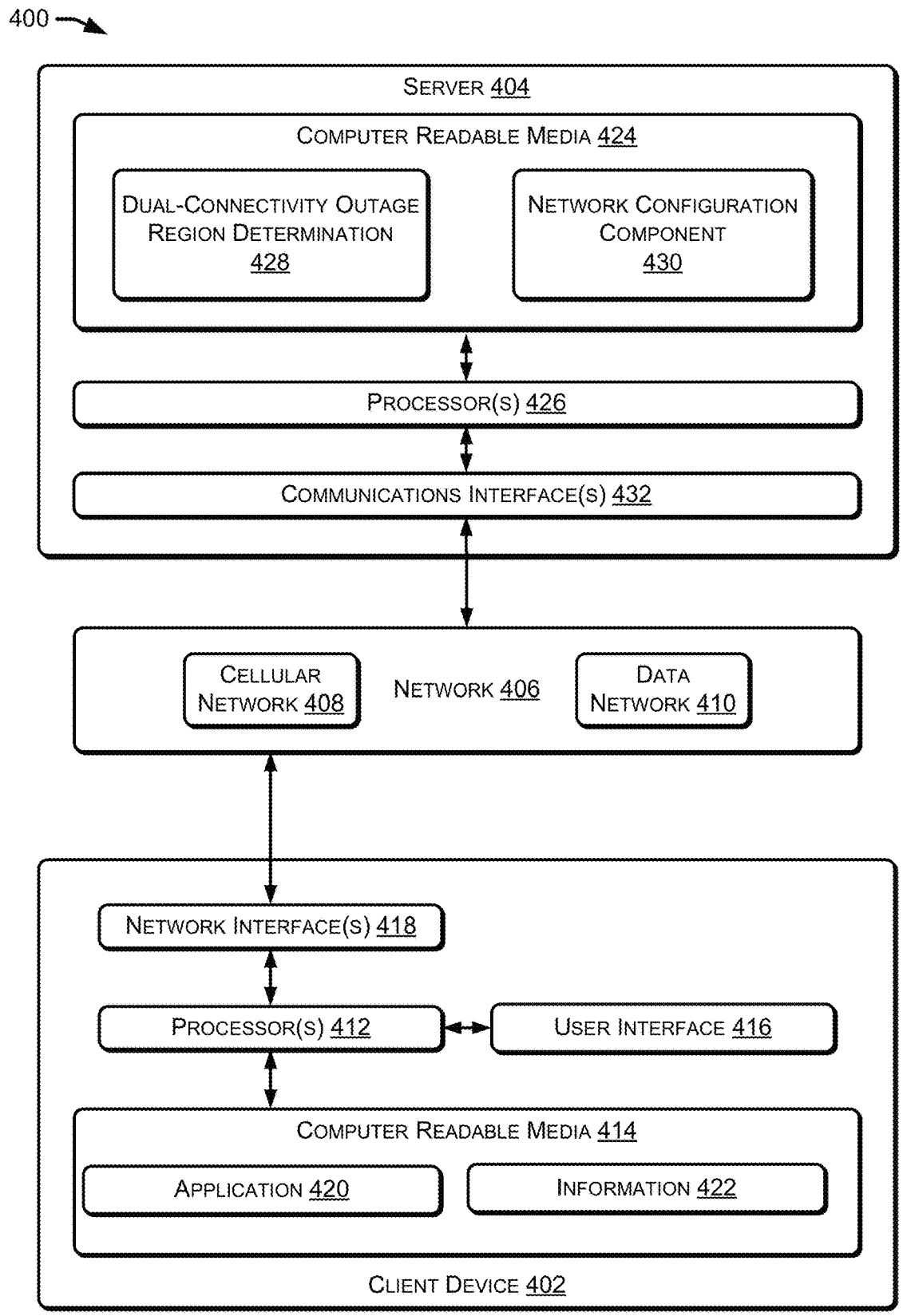

FIG. 4 is a block diagram illustrating a system 400 including various components for determining outage regions for dual-connectivity functionality within a mobile network, and configuring the mobile network based on the dual-connectivity outage regions, according to various implementations described herein. The system 400 includes a client device 402 coupled to a server 404, via a network 406. In some examples, the client device 402 may represent a UE device 110 and/or a controller within a network site 102 or 106 as described in the above examples. Additionally, the server 404 may represent the network configuration server 112 described above, and may include one or more servers or other computing devices associated with a mobile network 100. The network 406 may represent transport network 210 and/or wireless communication network 214, and/or other communication network(s) described herein.

Network 406 may include one or more networks, such as a cellular network 408 and a data network 410. The network 406 can include one or more core network(s) connected to terminal(s) via one or more access network(s). Example access networks may include LTE, WIFI, GSM Enhanced Data Rates for GSM Evolution (EDGE) Radio Access Network (GERAN), UTRAN, and other cellular access networks. Message transmission, reception, fallback, and deduplication can be performed, e.g., via 5G, 4G, LTE, 5G, WIFI, and/or other networks.

The cellular network 408 can provide wide-area wireless coverage using one or more technologies such as GSM, Code Division Multiple Access (CDMA), UMTS, LTE, NR, or the like. Example networks may include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the client device 402 can additionally or alternatively be performed using other technologies, such as wired (Plain Old Telephone Service, POTS, or PSTN lines), optical (e.g., Synchronous Optical NETwork, SONET) technologies, and the like.

The data network 410 may include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 404 includes or is communicatively connected with an IWF or other device bridging networks, e.g., LTE, 5G, and POTS networks. In some examples, the server 404 can bridge SS7 traffic from the PSTN into the network 406, e.g., permitting PSTN customers to place calls to cellular customers and vice versa.

In various implementations, the cellular network 408 and/or the data network 410 can carry voice or data. For example, the data network 410 can carry voice traffic using VoIP or other technologies as well as data traffic, or the cellular network 408 can carry data packets using HSPA, LTE, or other technologies as well as voice traffic. Some cellular networks 408 may carry both data and voice in a PS format. For example, many LTE networks carry voice traffic in data packets according to the VoLTE standard. Various examples herein provide origination and termination of, e.g., carrier-grade voice calls on, e.g., networks 406 using CS transports or mixed VoLTE/3G transports, or on client devices 402 including OEM handsets and non-OEM handsets.

As noted above, the client device 402 may represent a UE device 110 in some examples, such as when the server 404 represents a network configuration server 112 configured to transmit configuration instructions to UE devices 110. In such cases, the client device 402 may be or include a wireless phone, a wired phone, a tablet computer, a laptop computer, a smartwatch, or other type of terminal. Additionally or alternatively, the client device 402 may be a controller associated with a network site 102 or 106 within a mobile network 100, such as when the server 404 represents a network configuration server 112 configured to transmit configuration instructions to control systems of network sites 102 and 106. In such examples, the server 404 may include one or more processors 412, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 414, such as memory (e.g., random access memory (RAM), solid state drives (SSDs), or the like), disk drives (e.g., platter-based hard drives), another type of computer-readable media, or any combination thereof. The CRM or other memory of client device 402 may hold a datastore, e.g., an SQL or NoSQL database, a graph database, a BLOB, or another collection of data. The client device 402 can further include a user interface (UI) 416, e.g., including an electronic display device, a speaker, a vibration unit, a touchscreen, or other devices for presenting information to a user and receiving commands from the user. The client device 402 can further include one or more network interface(s) 418 configured to selectively communicate (wired or wirelessly) via the network 406, e.g., via a RAN or other access network.

The CRM 414 can be used to store data and instructions that are executable by the processors 412 to perform any of the various techniques and operations described herein. The CRM 414 can store various types of instructions and data, such as an operating system, device drivers, etc. The processor-executable instructions can be executed by the processors 412 to perform the various functions described herein.

The CRM 414 may be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 412. Tangible computer-readable media can include volatile and nonvolatile, removable and non-removable media implemented in any method or technology for storage of information, such as computer readable instructions, data structures, program components, or other data.

The CRM 414 can include processor-executable instructions of an application 420. The CRM 414 can store information 422 identifying the client device 402. The information 422 can include, e.g., an IMEI, an IMSI identifying the subscriber using client device 402, an IP address, MAC address, or identifying information. The CRM 414 can additionally or alternatively store credentials (omitted for brevity) used for access, e.g., to IMS or RCS services.

The server 404 may include one or more processors 426 and one or more CRM 424. The CRM 424 may store processor-executable instructions of a dual-connectivity outage region determination component 428 and/or a network configuration component 430, configured to perform any combination of the various techniques and operations described herein. The CRM 424 also may store various types of instructions and data, such as an operating system, device drivers, etc. The processor-executable instructions within the CRM 424 can be executed by the processors 412 to perform the various techniques and operations described herein, including the techniques and operations described in reference to the network configuration server 112.

In some examples, server 404 may communicate with (e.g., is communicatively connectable with) one or more client device(s) 402 and/or other devices, via one or more communications interface(s) 432, e.g., network transceivers for wired or wireless networks, or memory interfaces. Example communications interface(s) 432 can include ETHERNET or FIBRE CHANNEL transceivers, WIFI radios, or DDR memory-bus controllers (e.g., for DMA transfers to a network card installed in a physical server 404).

In some examples, processor 412 and, if required, CRM 414 may be referred to for brevity herein as a controller or a control unit. For example, a controller or control unit can include a CPU or DSP and instructions executable by that CPU or DSP to cause that CPU or DSP to perform functions described herein. Additionally, or alternatively, a controller or control unit can include an ASIC, FPGA, or other logic device(s) wired (physically or via blown fuses or logic-cell configuration data) to perform operations described herein. Other examples of controllers and/or control units can include processor 426 and, if required, CRM 424.

Figure 5:
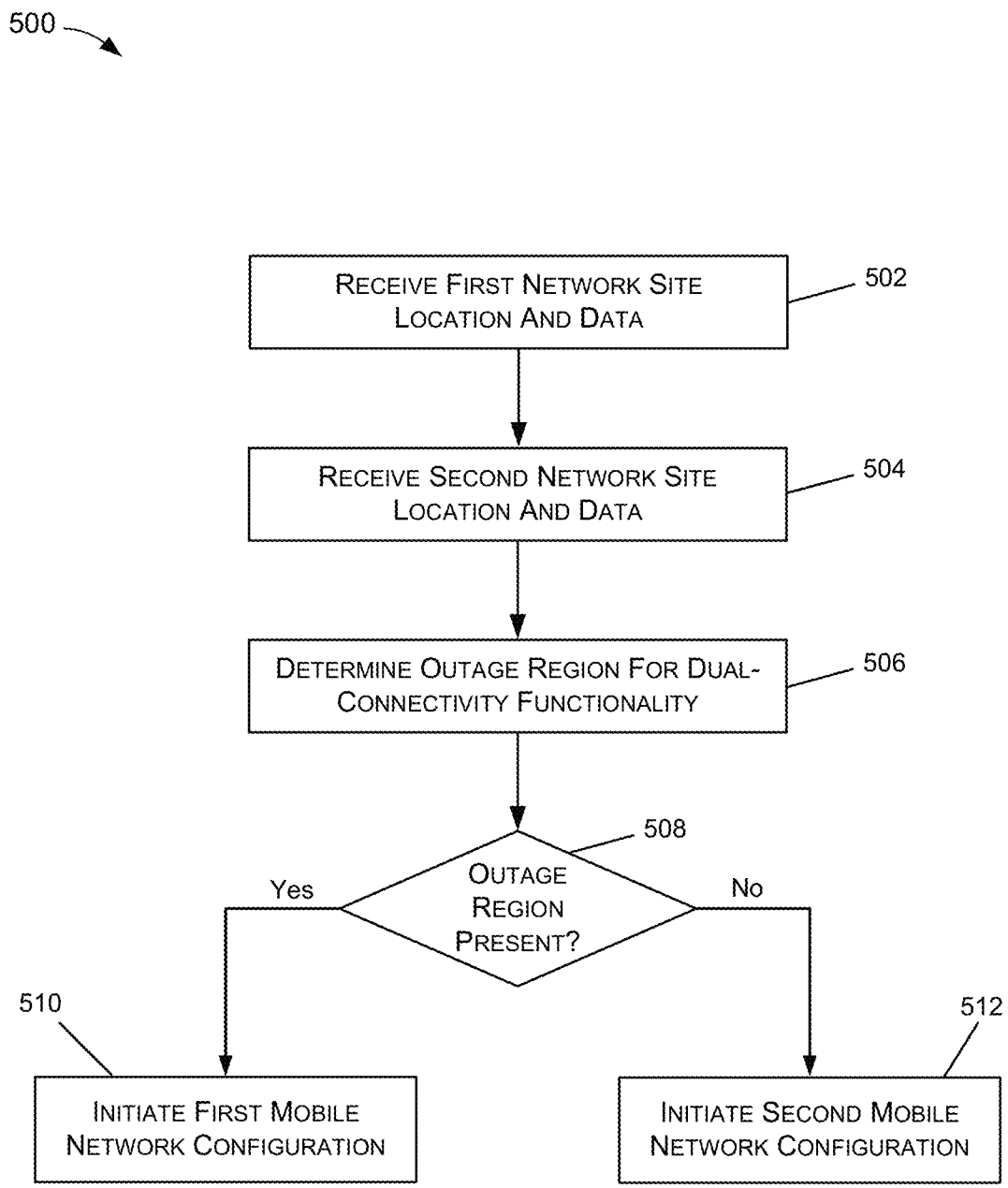

FIG. 5 is a flow diagram illustrating an example process 500 of initiating one or more configurations on a mobile network, based on a determined outage region for dual-connectivity functionality within the mobile network. As described below, the operations described in connection with process 500 may be performed by a network configuration server 112, which may be implemented as a server 404 including some or all of the components described above such as a dual-connectivity outage region determination component 428 and/or a network configuration component 430. In other examples, the operations described in process 500 may be performed by one or more UE devices 110, controllers within network sites 102 and/or 106, and/or other combinations of computing devices described herein.

At operation 502, the network configuration server 112 may receive data associated with a first network site operating within a mobile network 100. In this example, the first network site may correspond to network site 106 in the above examples, which may be a master network site (e.g., an LTE master node) configured to support dual-connectivity functionality. The network configuration server 112 may request and receive various network site data in operation 502, including the location of the first network site 106 (e.g., coordinates of transceiver 206), the type(s) of wireless technologies supported by the first network site 106, and/or coverage area(s) 108 associated with the wireless technologies supported by the first network site 106. In various examples, the network configuration server 112 may receive the network site location and other network site data directly from the network site 106. Additionally or alternatively, the network configuration server 112 may receive the network site location and data from a datastore within the network configuration server 112, or from a separate computing device or server associated with the mobile network 100, such as network site location datastore.

At operation 504, the network configuration server 112 may receive data associated with a second, non-collocated network site operating within the mobile network 100. In operation 504, the network configuration server 112 may receive location data (e.g., transceiver coordinates) and/or additional network site data (e.g., supported wireless technologies, coverage areas, etc.) for a second network site. The second network site may correspond to network site 102 in the above examples, which may be a second network site (e.g., a 5G NR secondary node). In some examples, operation 504 may be similar or identical to operation 502, and/or operations 502 and 504 may be combined into a single data retrieval operation.

At operation 506, the network configuration server 112 may determine an outage region, if present, for dual-connectivity functionality, based on the data associated with the first and second network sites. To determine the outage region in operation 506, the network configuration server 112 may use the techniques and/or equations for determining dual-connectivity outage regions described above in reference to FIGS. 1-3. As described in detail above, the determination of a dual-connectivity outage region for non-collocated network sites 102 and 106, where the network sites 102 and 106 support different wireless technologies, may be based on the locations of the network sites 102 and 106, the associated coverage areas 104 and 108 of the network sites 102 and 106, and a threshold value representing a maximum difference in the path lengths between a UE device 110 and the network sites 102 and 106 for which dual-connectivity may be supported.

For example, in operation 506 the network configuration server 112 may initially determine whether the distance ($D_{m\_s}$) between the network sites 102 and 106 is greater than the maximum path length difference threshold (t). If $D_{m\_s}$ is less than or equal to the threshold (t), an outage region does not exist for dual-connectivity functionality provided by network sites 102 and 106. If $D_{m\_s}$ is greater than the threshold (t), an outage region does exist and the network configuration server 112 may determine the borders of the crescent-shaped outage region, based on outer perimeter of the coverage area 108 of one of master network site 106, and an interior border of locations at which the distance to the farther secondary network site 102 ($D_s$) equals the distance to the closer master network site 106 ($D_m$) plus the threshold value (t). Additionally, in operation 504, the network configuration server 112 may calculate the area ($A_x$) of the determined outage region, and/or may calculate an outage ratio ($A_x/A_m$) for the outage ratio with respect to the coverage area of the master network site 102.

At operation 508, if the network configuration server 112 determines that a dual-connectivity outage region exists (508:Yes), then process 500 may proceed to operation 510 where the network configuration server 112 may initiate a first set of configurations of the mobile network 100. For instance, in each of the scenarios described above in FIGS. 3B-3D, the network configuration server 112 may determine that a dual-connectivity outage region exists, and may determine the size, shape, and coordinate boundaries of the outage region.

Otherwise, if the network configuration server 112 determines that a dual-connectivity outage region does not exist (508:No), then process 500 may proceed to operation 512 where the network configuration server 112 may initiate a second set of configurations for the mobile network 100. For instance, in the scenario described above in FIG. 3A, the network configuration server 112 may determine that an outage region does not exist for network sites 102 and 106, indicating that dual-connectivity functionality may be available for any UE device 110 within the coverage areas of both network sites 102 and 106.

At operations 510 and/or 512, the network configuration server 112 may determine and initiate different types of configurations at the mobile network 100. Various examples of configuration operations that may be initiated by the network configuration server 112 are described below in more detail in FIGS. 6-9. As discussed in these examples, the network configuration server 112 may initiate configurations of the network sites of the mobile network 100 and/or configurations of the UE devices operating within the mobile network 100. Additionally or alternatively, the network configuration server 112 may calculate and analyze advance performance metrics for the mobile network 100 based on the dual-connectivity outage data calculated in operation 506. Additionally, operation 510 and/or operation 512 may be optional in some cases. For instance, the network configuration server 112 may be configured to initiate a particular reconfiguration within the mobile network 100 either when an outage region is detected (508: Yes), or alternatively when an outage region is not detected (508:No).

Further, although example process 500 describes performing mobile network configurations based on the determination of a single dual-connectivity outage region based on two network sites, in other examples the network configuration server 112 may perform mobile network configurations based on an analyses of the dual-connectivity outage regions for larger numbers of network sites and/or for the entire mobile network 100. For instance, network configuration server 112 may perform operations 502-506 for multiple pairs or groups of network sites (e.g., for each LTE-only master node network site) within the mobile network 100, or for any portion of sub-network of the mobile network 100. Based on the data from multiple sets of operations 502-506, the network configuration server 112 may calculate the number (or percentage) of network sites having dual-connectivity outage regions, the total area of outage regions, and/or the total outage ratio for the analyzed portion of the mobile network 100, etc. The network configuration server 112 then may initiate one or more network configurations based on the dual-connectivity outage region data associated with the larger number of network sites and/or the entire mobile network 100.

Figure 6:
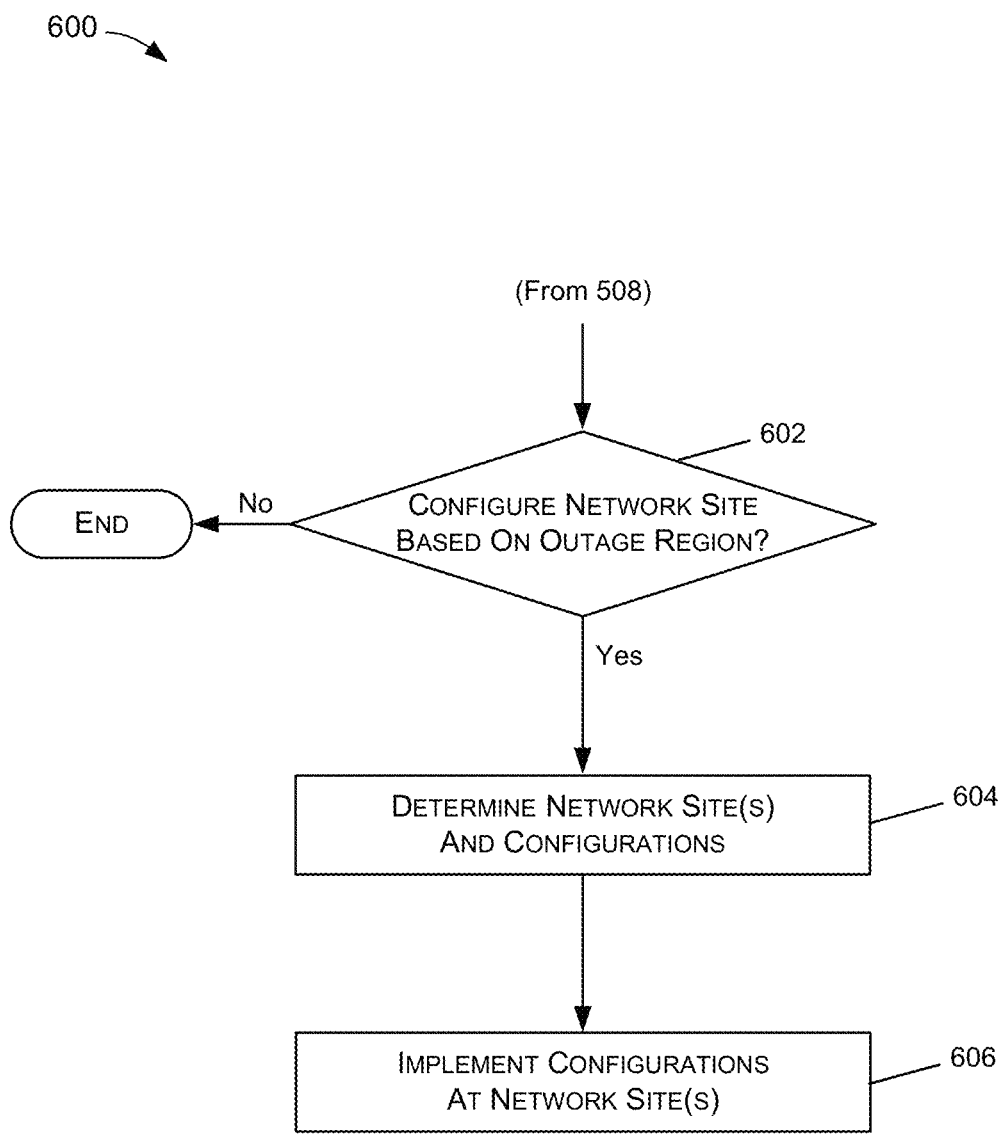
Figure 7:
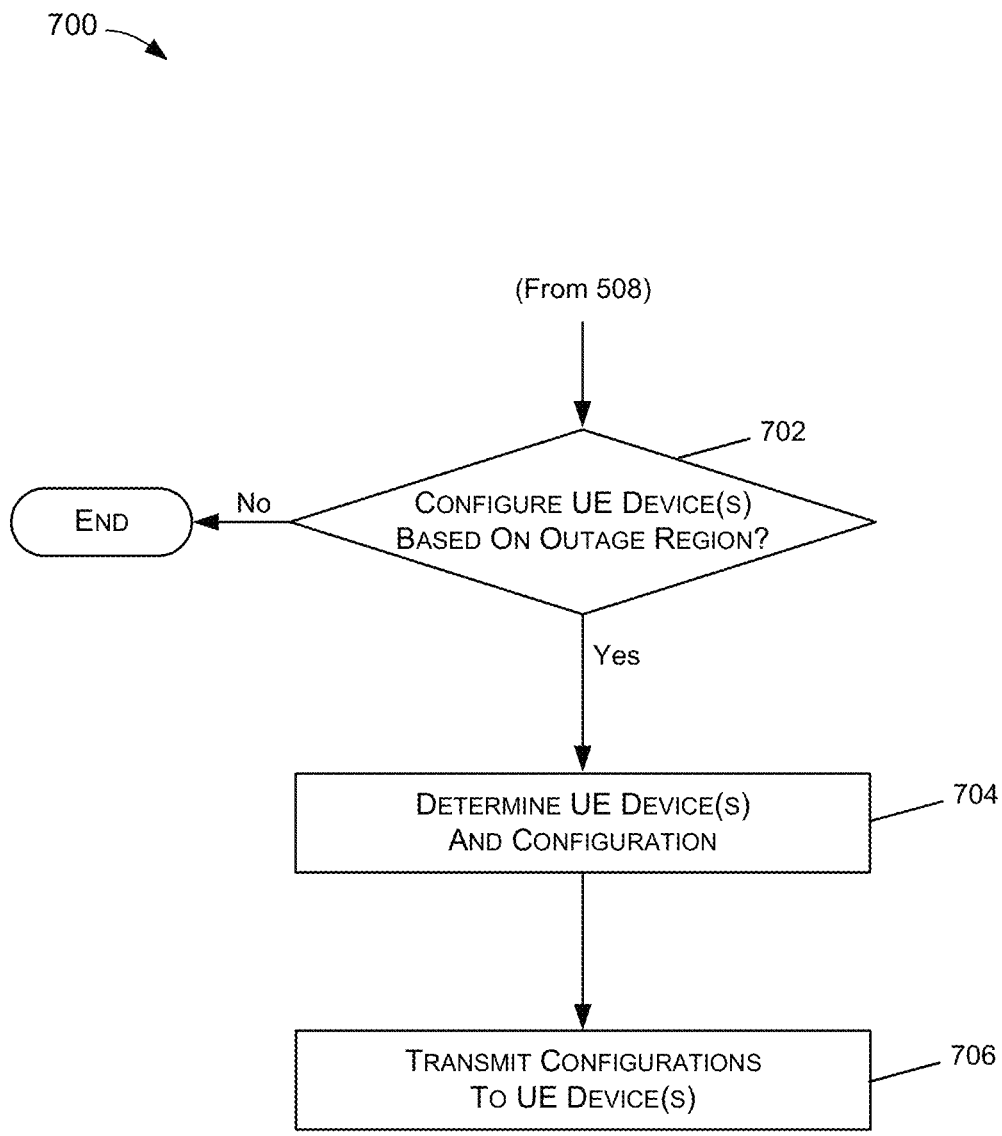

FIGS. 6-7 illustrate processes for configuring the components of a mobile network 100, based on the determined outage region(s) for dual-connectivity functionality within the mobile network 100. Specifically, FIG. 6 illustrates a process 600 of configuring one or more network sites, and FIG. 7 illustrates a process 700 of configuring one or more UE devices. Each of processes 600 and 700 may correspond to mobile network configurations performed in operations 510 and/or 512 of process 500. For example, in operations 510 and/or 512 the network configuration server 112 initially may determine one or more configurations to be applied at the mobile network 100, in response to determining the dual-connectivity outage regions in operations 506-508. Determining which configurations (if any) to apply to mobile network 100, may include the network configuration server 112 determining the components to be configured (e.g., network sites, UE devices, datastores, etc.), the types of configurations to be performed, and the specific configuration settings to be applied.

In various implementations, the network configuration server 112 may use various different techniques to determine the configuration(s) to perform on (or apply to) the mobile network 100, in response to determining the dual-connectivity outage regions. In some examples, the network configuration server 112 may determine the configurations to be performed using heuristics and/or rules-based components, in which the network components to configure and the configuration types and settings are determined, based on the characteristics of the dual-connectivity outage regions determined within the mobile network 100. Additionally or alternatively, the network configuration server 112 may use machine-learning based models and algorithms to determine the components to configure and the configuration types/settings to perform on the mobile network 100, in response to different numbers and characteristics dual-connectivity outage regions. For instance, the network configuration server 112 may execute one or more trained machine-learned models that outputs configuration instructions for the mobile network 100, based on inputs representing the dual-connectivity outage regions determined in operations 506-508. In various examples, a trained machine-learned model may output configuration instructions to reduce or minimize the outage areas and/or outage ratios of the dual-connectivity outage regions in the mobile network 100, reduce or minimize the number of UE devices affected by dual-connectivity outage regions, and/or increase or maximize the network performance metrics for UE devices 110 within the mobile network 100, etc.

FIG. 6 is a flow diagram illustrating an example process 600 of configuring a network site, such as network site 102 or 106, within a mobile network 100, based on the dual-connectivity outage region(s) determined within the mobile network 100. Process 600 may correspond to the mobile network configurations performed at operations 510 and/or operation 512 in process 500. As described below, operations 602-606 may be performed by the network configuration server 112 in response to the determination of dual-connectivity outage region(s) performed at operations 506 and 508. In other examples, the operations described in process 600 may be performed by or in conjunction with one or more UE devices 110, controllers within network sites 102 and/or 106, and/or other combinations of computing devices described herein.

At operation 602, the network configuration server 112 determines whether one or more network sites within the mobile network 100 are to be configured, based on the dual-connectivity outage region(s) determined in operations 506 and 508. As noted above, the network configuration server 112 may use rules and/or machine-learning based components to determine which components of the mobile network 100 are to be configured, based on the dual-connectivity outage region(s) within the mobile network 100. When the network configuration server 112 determines that a network site is not to be configured (or reconfigured) based on the dual-connectivity outage regions within the mobile network 100 (602:No), then process 600 ends and configurations may be performed elsewhere within the mobile network.

In other examples, when the network configuration server 112 determines that a network site is to be configured (or reconfigured) based on the dual-connectivity outage regions within the mobile network 100 (602:Yes), then at operation 604 the network configuration server 112 determines which network site(s) are to be configured. The network sites determined in operation 604 may include an existing master network site (e.g., 106) or secondary network site (e.g., 102) in a non-collocated arrangement of network sites providing dual connectivity. In other examples, the network sites determined in operation 604 may include any network site (e.g., any transceiver and/or base station) within the mobile network 100, and/or new network sites not yet installed or operational within the mobile network 100.

Along with the determining the network sites to be configured, the network configuration server 112 also may determine the types of network site configurations and configuration settings in operation 604. In some examples, the network configuration server 112 may reconfigure existing network sites (e.g., LTE master nodes) to support or not support dual-connectivity functionality, based on a threshold outage region area or outage ratio associated with the network site. In other examples, to reduce or remediate the dual-connectivity outage regions within the mobile network 100, the network configuration server 112 may reconfigure one or more network sites by changing the coverage areas (e.g., 104 and 108) associated with the network sites (e.g., increasing or decreasing transceiver power), changing the wireless technologies provided by the network sites (e.g., adding 5G NR or LTE service to a network site), and/or changing the handover parameters associated with network site(s). In still other examples, the network configuration server 112 may determine one or more physical locations within the mobile network 100 at which to relocate existing network sites and/or to install new network sites, in order to reduce or eliminate the dual-connectivity outage regions within the mobile network 100.

At operation 606, the network configuration server 112 may implement the network site configurations determined at operation 604. In some instances, the network configuration server 112 may transmit sets of reconfigurations parameters (e.g., dual-connectivity functionality parameters, transceiver power/coverage range modifications, handover parameters, etc.) to the particular network sites identified in operation 604 for reconfiguration. Additionally or alternatively, the network configuration server 112 may implement the mobile network configurations by initiating service requests to perform network site modifications (e.g., modifying the wireless technologies supported by a network site, or adding/replacing the transceivers at an existing site), to relocate an existing network site to a determined location, and/or to install a new network site at a determined location.

FIG. 7 is a flow diagram illustrating an example process 700 of configuring a UE device 110 within a mobile network 100, based on the dual-connectivity outage region(s) determined within the mobile network 100. As noted above, process 700 may correspond to the mobile network configurations performed at operations 510 and/or operation 512 in process 500. As described below, operations 702-706 may be performed by the network configuration server 112 in response to the determination of dual-connectivity outage region(s) performed at operations 506 and 508. In other examples, the operations described in process 700 may be performed by or in conjunction with one or more UE devices 110, controllers within network sites 102 and/or 106, and/or other combinations of computing devices described herein.

At operation 702, the network configuration server 112 determines whether one or more UE devices 110 within the mobile network 100 are to be configured, based on the dual-connectivity outage region(s) determined in operations 506 and 508. As noted above, the network configuration server 112 may use rules and/or machine-learning based components to determine which components of the mobile network 100 are to be configured, based on the dual-connectivity outage region(s) within the mobile network 100. When the network configuration server 112 determines that a UE device 110 is not to be configured (or reconfigured) based on the dual-connectivity outage regions within the mobile network 100 (702:No), then process 700 ends and configurations may be performed elsewhere within the mobile network.

In other examples, when the network configuration server 112 determines that a UE device 110 is to be configured (or reconfigured) based on the dual-connectivity outage regions within the mobile network 100 (702:Yes), then at operation 704 the network configuration server 112 determines which UE devices 110 are to be configured, and which configurations are to be applied to those UE devices 110. In some examples, the network configuration server 112 may identify each UE device 110 within a determined dual-connectivity outage region, and may configure those UE devices 110 to not use dual-connectivity functionality. In other examples, the configurations in operation 704 may include determining and transmitting the locations of the dual-connectivity outage regions to UE devices 110 in or near the outage regions, and/or determining and transmitting the nearest location to the UE devices 110 that is not within an outage region. In still other examples, the network configuration server 112 may determine configuration settings for particular UE devices 110, including specific handover parameters or selecting a particular wireless technology (e.g., LTE or 5G NR) to use for data transfers, based on the location of the UE device 110 in relation to the determined outage regions.

At operation 706, the network configuration server 112 may transmit configuration instructions corresponding to the configurations determined in operation 704, to the appropriate UE devices 110 within the mobile network 100. In some instances, the network configuration server 112 may transmit UE device reconfigurations parameters (e.g., dual-connectivity parameters, wireless service parameters, handover parameters, transceiver power/range modifications, etc.) to the UE devices 110 identified in operation 604 for reconfiguration, via one or more communication networks 210 of the mobile network 100.

Figure 8:
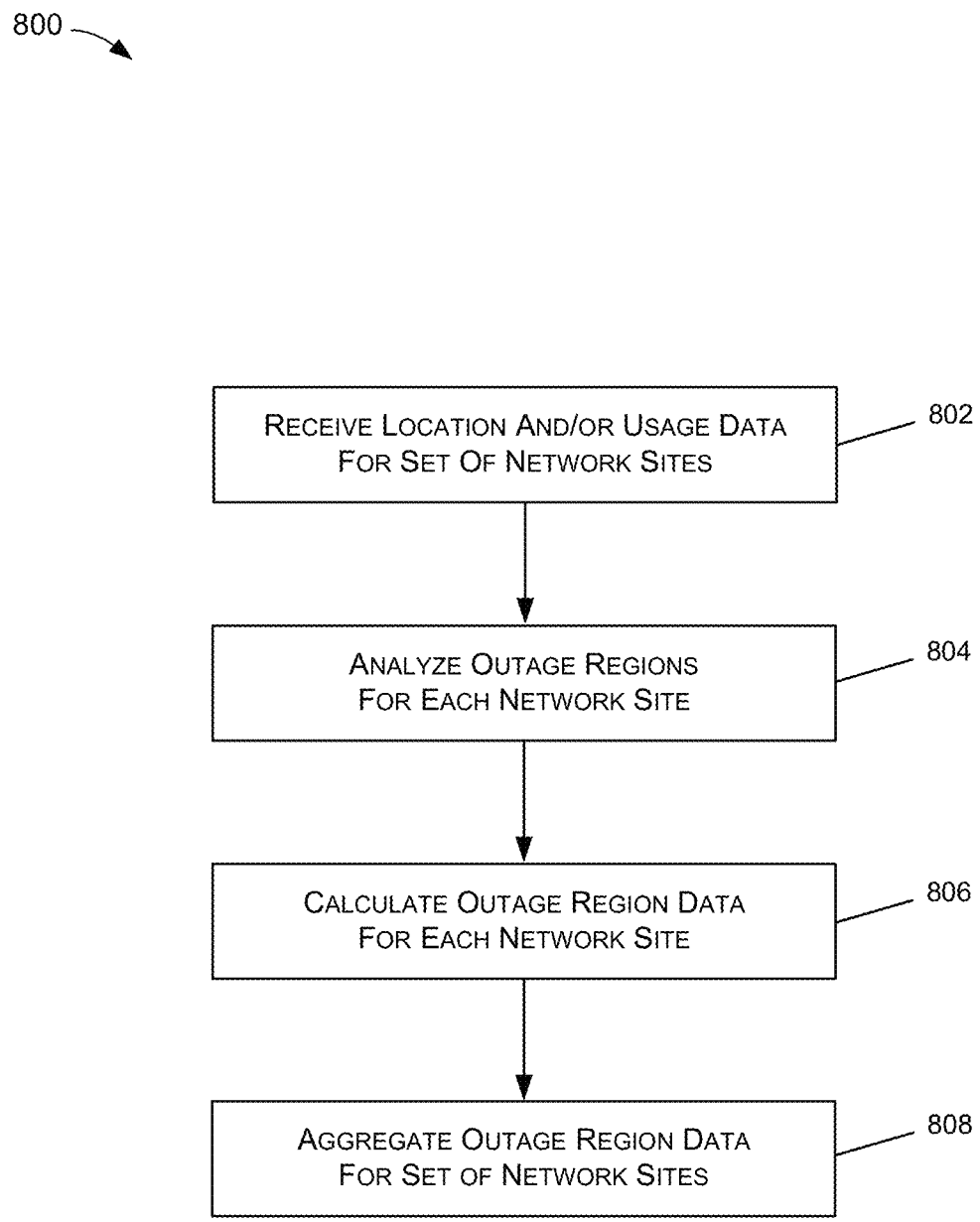
Figure 9:
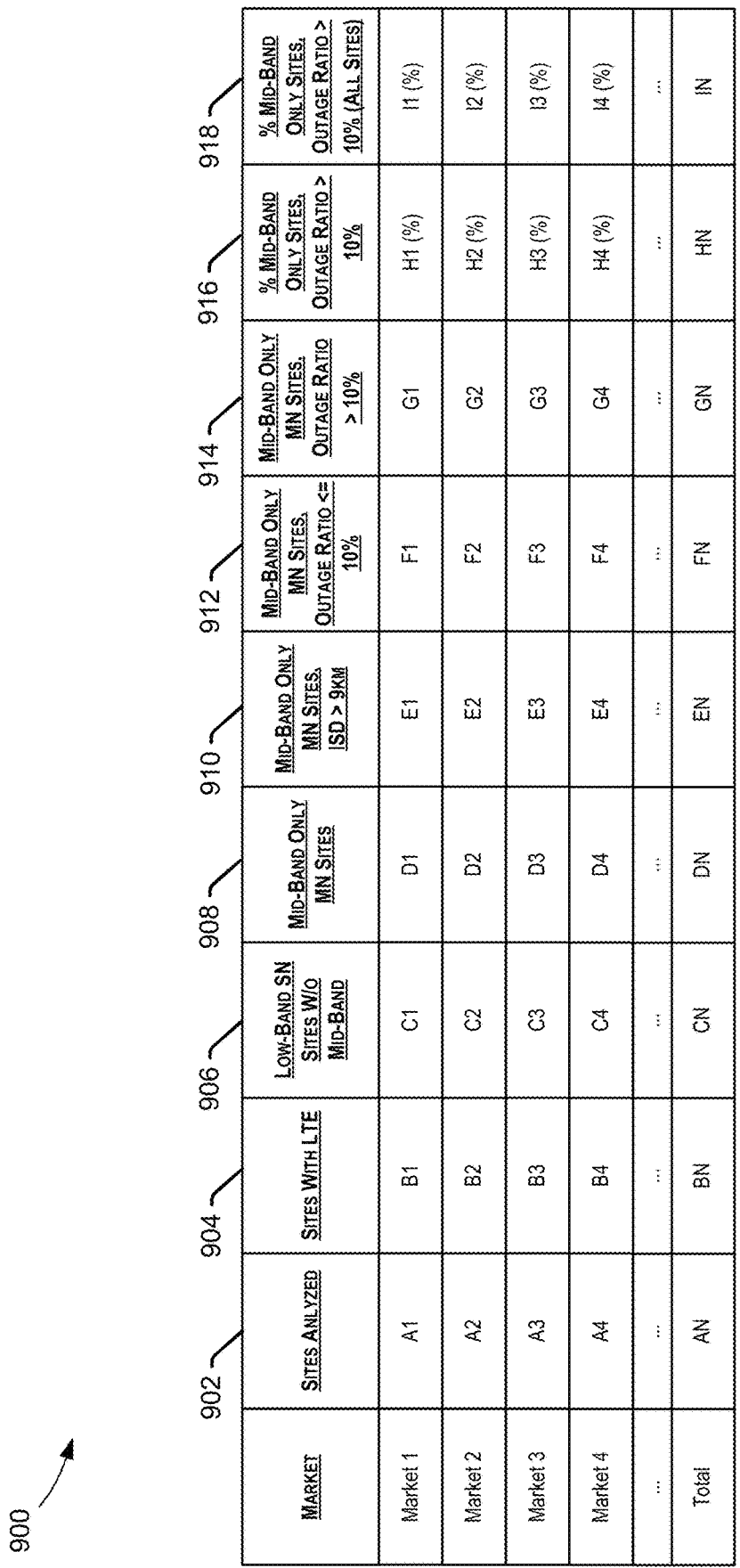

FIG. 8 is a flow diagram illustrating an example process 800 of calculating outage areas and outage ratios for dual-connectivity functionality within a mobile network 100. As noted above, the network configuration server 112 may calculate and analyze advance performance metrics for a mobile network 100, based on the dual-connectivity outage data calculated in operation 506. FIGS. 8 and 9 represent an example of mobile network performance metrics based on the determination of the dual-connectivity outage regions. In some examples, a network configuration server 112 may use the dual-connectivity performance metrics calculated in these examples, for an entire mobile network 100 and/or individual regions (or markets) within a mobile network, to determine mobile network configurations such as configurations network sites or UE devices, re-routing of network traffic, modifications of network sites, and/or the addition of new network sites into the mobile network 100.

At operation 802, network configuration server 112 may receive network site locations and/or wireless service usage data associated with one or more network sites (e.g., 102 and 106) within a mobile network 100. The data received in operation 802 may include, for example, the locations (or coordinates) of the network sites, the type(s) of wireless technologies supported by the network sites (e.g., 3G, 4G, LTE, 5G NR, etc.), and the coverage area associated with each wireless technology. Additionally, the data received in operation 802 may include data representing the UE devices 110 connected to the network sites (e.g., types of UE devices, connection times, device locations, etc.) and the wireless data transferred via the network sites (e.g., connection/service types, amounts of incoming and outgoing data, etc.).

At operation 804, the network configuration server 112 may analyze one or more dual-connectivity outage areas based on the network site data received in operation 802. Operation 804 may include determining the existence of dual-connectivity outage regions, along with the sizes (e.g., areas) and locations of the outage regions, using the techniques described above in reference to FIGS. 1-5. Operation 804 also may include analyzing the effects of the dual-connectivity outage regions within a specific region (or market) of the mobile network 100, or within the mobile network 100 as a whole. Dual-connectivity outage regions may be analyzed in terms of their affected geographic areas, for example, by calculating outage region areas, outage ratios, etc. Additionally or alternatively, dual-connectivity outage regions may be analyzed in terms of the UE devices 110 and/or network traffic impacted by the outage regions, for example, by calculating a number or percentage of UE devices within an outage region, or calculating amounts or percentages of network traffic affected, data stream speed differences, etc.

At operation 806, the network configuration server 112 may perform calculations based on the outage region data analyzed in operation 804, individually for each identified outage region within the market or mobile network 100 as a whole. For instance, in operation 806 the network configuration server 112 may calculate an outage area, outage ratio, a number/percentage of affected UE devices, an amount/percentage of affected network traffic, etc., for a single network site (e.g., an LTE master node). At operation 808, the outage region data calculated in operation 806 for multiple different network sites may be aggregated into specific regions (e.g., markets) or for the mobile network 100 as a whole.

In some cases, the calculation of an outage area for a dual-connectivity region may be performed using a mathematical equation for determining the area of a lens-shaped intersection between two circles. For example, FIG. 9 shows a data chart 900 including an example dual-connectivity outage region analysis for several markets of a mobile network 100. In this example, for each of Markets 1-4 (e.g., counties, cities, or regions), and for the mobile network 100 as a whole, data chart 900 includes various dual-connectivity outage region data calculations based on analyses and aggregations of outage region data from multiple different network sites. Although data chart 900 may relate specifically to EN-DC functionality, in other examples similar outage region data calculations may be performed for other dual-connectivity (or multi-connectivity) functionality based on non-collocated network sites. In this example, for each of Markets 1-4, and for the mobile network 100 as a whole, the aggregated dual-connectivity outage region data shows the number of network sites analyzed (902), the number of these network sites that support LTE service (904), the number of low-band secondary node network sites without mid-band (e.g., LTE) service (906), the number of network sites that support only mid-band (e.g., LTE) service (908), the number of mid-band only master node network sites with an inter-site distance (ISD) of greater than 9 km to a low-band secondary network site (910), the number of mid-band only master node network sites with an outage ratio ($A_x/A_m$) of less than or equal to 10% (912), the number of mid-band only master node network sites with an outage ratio ($A_x/A_m$) of greater than 10% (914), the percentage of mid-band only master node network sites with an outage ratio ($A_x/A_m$) of greater than 10% (916), and the percentage of mid-band only master node network sites with an outage ratio ($A_x/A_m$) of greater than 10% with respect to all analyzed sites in the market (918). In this example, data chart 900 may be filled by numeric values and/or percentages, represented by the variables A1 to I4, and summed or aggregated in the "Total" column by variables AN to IN.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed (or may be omitted entirely), and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving a first location of a first base station within a mobile network;
   determining a first coverage area associated with a first wireless technology of the first base station;
   receiving a second location of a second base station within the mobile network;
   determining a second coverage area associated a second wireless technology of the second base station;
   determining a distance between the first base station and the second base station;
   determining a physical region within which a dual-connectivity functionality for the first wireless technology and the second wireless technology is supported, based at least in part on the distance between the first base station and the second base station;
   determining an outage region within which the dual-connectivity functionality is not supported, wherein the outage region is entirely within the second coverage area, and wherein the second coverage area is entirely within the first coverage area; and
   configuring the mobile network based on the determination of the physical region.

2. The method of claim 1, wherein configuring the mobile network comprises modifying a capability of at least one of the first base station or the second base station.

3. The method of claim 1, wherein configuring the mobile network comprises determining a location for a new base station within the mobile network.

4. The method of claim 1, wherein configuring the mobile network comprises:
   determining a location of a first mobile device, wherein the location is within the first coverage area and the second coverage area; and
   based on the location of the first mobile device, configuring the first mobile device to operate in accordance with the dual-connectivity functionality.

5. The method of claim 1, further comprising:
   determining an outage ratio for the second base station, based on the second coverage area and the outage region.

6. The method of claim 1, further comprising:
   determining a boundary for the outage region based on a distance between the boundary and the first base station, a distance between the boundary and the second base station, and a threshold distance associated with the dual-connectivity functionality.

7. The method of claim 6, wherein threshold distance is determined based on a time difference in propagation paths between the first base station and the second base station.

8. A computer system comprising:
   one or more processors; and
   memory storing executable instructions that, when executed by the one or more processors, cause the one or more processors to perform operations comprising:
   receiving a first location of a first base station within a mobile network;
   determining a first coverage area associated with a first wireless technology of the first base station;
   receiving a second location of a second base station within the mobile network;
   determining a second coverage area associated a second wireless technology of the second base station;
   determining a distance between the first base station and the second base station;
   determining a physical region within which a dual-connectivity functionality for the first wireless technology and the second wireless technology is supported, based at least in part on the distance between the first base station and the second base station;
   determining an outage region within which the dual-connectivity functionality is not supported, wherein the outage region is entirely within the second coverage area, and wherein the second coverage area is entirely within the first coverage area; and
   configuring the mobile network based on the determination of the physical region.

9. The computer system of claim 8, wherein configuring the mobile network comprises modifying a capability of at least one of the first base station or the second base station.

10. The computer system of claim 8, wherein configuring the mobile network comprises determining a location for a new base station within the mobile network.

11. The computer system of claim 8, wherein configuring the mobile network comprises:
    determining a location of a first mobile device, wherein the location is within the first coverage area and the second coverage area; and
    based on the location of the first mobile device, configuring the first mobile device to operate in accordance with the dual-connectivity functionality.

12. The computer system of claim 8, the operations further comprising:
    determining an outage ratio for the second base station, based on the second coverage area and the outage region.

13. The computer system of claim 8, the operations further comprising:
    determining a boundary for the outage region based on a distance between the boundary and the first base station, a distance between the boundary and the second base station, and a threshold distance associated with the dual-connectivity functionality.

14. The computer system of claim 13, wherein threshold distance is determined based on a time difference in propagation paths between the first base station and the second base station.

15. One or more non-transitory computer-readable media storing instructions that, when executed, cause one or more processors to perform acts comprising:
    receiving a first location of a first base station within a mobile network;
    determining a first coverage area associated with a first wireless technology of the first base station;
    receiving a second location of a second base station within the mobile network;
    determining a second coverage area associated a second wireless technology of the second base station;
    determining a distance between the first base station and the second base station;
    determining a physical region within which a dual-connectivity functionality for the first wireless technology and the second wireless technology is supported, based at least in part on the distance between the first base station and the second base station;

determining an outage region within which the dual-connectivity functionality is not supported, wherein the outage region is entirely within the second coverage area, and wherein the second coverage area is entirely within the first coverage area; and configuring the mobile network based on the physical region.

16. The non-transitory computer-readable media of claim 15, wherein configuring the mobile network comprises modifying a capability of at least one of the first base station or the second base station.

17. The non-transitory computer-readable media of claim 15, wherein configuring the mobile network comprises determining a location for a new base station within the mobile network.

18. The non-transitory computer-readable media of claim 15, wherein configuring the mobile network comprises:
   determining a location of a first mobile device, wherein the location is within the first coverage area and the second coverage area; and
   based on the location of the first mobile device, configuring the first mobile device to operate in accordance with the dual-connectivity functionality.

19. The non-transitory computer-readable media of claim 15, wherein the acts further comprise determining an outage ratio for the second base station, based on the second coverage area and the outage region.

20. The non-transitory computer-readable media of claim 15, wherein the acts further comprise determining a boundary for the outage region based on a distance between the boundary and the first base station, a distance between the boundary and the second base station, and a threshold distance associated with the dual-connectivity functionality.

* * * * *